(12) United States Patent
Cassidy

(10) Patent No.: US 8,395,519 B2
(45) Date of Patent: Mar. 12, 2013

(54) DEVICE AND METHOD OF DETERMINING SAFETY IN A BATTERY PACK

(75) Inventor: David E. Cassidy, Chelmsford, MA (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 12/949,905

(22) Filed: Nov. 19, 2010

(65) Prior Publication Data

US 2012/0126991 A1  May 24, 2012

(51) Int. Cl.
*G08B 21/00* (2006.01)
(52) U.S. Cl. .................. 340/636.1; 340/636.19
(58) Field of Classification Search .......... 340/636.1, 340/636.18, 636.19, 686.1, 686.2; 702/63; 429/90, 149; 320/134, 135, 136
See application file for complete search history.

(56) References Cited

U.S. PATENT DOCUMENTS

| | | | |
|---|---|---|---|
| 4,698,144 A | 10/1987 | Wainesdi |
| 5,293,007 A | 3/1994 | Darst et al. |
| 5,920,179 A | 7/1999 | Pedicini |
| 6,114,835 A | 9/2000 | Price |
| 6,278,604 B1 | 8/2001 | Patel et al. |
| 6,624,612 B1 | 9/2003 | Lundquist |
| 6,701,150 B1 | 3/2004 | Huang et al. |
| 6,844,703 B2 | 1/2005 | Canter |
| 6,873,134 B2 | 3/2005 | Canter et al. |
| 7,081,737 B2 | 7/2006 | Liu et al. |
| 7,126,312 B2 | 10/2006 | Moore |
| 2005/0077875 A1 | 4/2005 | Bohley |
| 2005/0221839 A1 | 10/2005 | Chan et al. |
| 2005/0269988 A1 | 12/2005 | Thrap |
| 2005/0269989 A1 | 12/2005 | Geren et al. |
| 2006/0033475 A1 | 2/2006 | Moore |
| 2006/0071643 A1 | 4/2006 | Carrier et al. |

(Continued)

FOREIGN PATENT DOCUMENTS

| | | |
|---|---|---|
| DE | 3503018 A1 | 7/1986 |
| DE | 102009025373 A1 | 12/2010 |

(Continued)

OTHER PUBLICATIONS

Barsukow, Yevgen; Cell Balancing Using bq20zxx; Nov. 2005; Texas Instruments; pp. 1-3.

(Continued)

*Primary Examiner* — Toan N Pham
(74) *Attorney, Agent, or Firm* — Andrus, Sceales, Starke & Sawall, LLP

(57) ABSTRACT

A battery pack includes at least one battery cell that expands and contracts in relation to the chemical conditions of the battery cell. A substrate is configured to contact the at least one battery cell. A sensor is attached to the substrate and the sensor produces a signal indicative of the displacement of the substrate. A controller is communicatively connected to the sensor such that the controller receives the signal from the sensor. The controller processes the signal to produce an indication of a status of the battery cell. A method of monitoring battery safety includes movably securing a substrate across at least one cell of a battery. A displacement of the substrate is measured. The measured displacement is processed with a controller to identify a safety status of the at least one cell. An output device is operated with a controller to provide an indication of the safety status of the at least one cell of the battery.

20 Claims, 5 Drawing Sheets

U.S. PATENT DOCUMENTS

| | | |
|---|---|---|
| 2006/0255769 A1 | 11/2006 | Liu et al. |
| 2008/0097704 A1 | 4/2008 | Notten et al. |
| 2008/0169788 A1* | 7/2008 | Bobbin et al. ............ 320/135 |
| 2012/0075107 A1* | 3/2012 | Newman et al. ....... 340/636.19 |
| 2012/0139738 A1* | 6/2012 | Hendren et al. ......... 340/636.1 |

FOREIGN PATENT DOCUMENTS

| | | |
|---|---|---|
| EP | 0233638 A2 | 8/1987 |
| GB | 2011698 A | 7/1979 |
| JP | 57207878 A | 12/1982 |
| JP | 2111232 A | 4/1990 |
| JP | 05326027 A | 12/1993 |
| JP | 06052901 A | 2/1994 |
| JP | 08194037 A | 7/1996 |
| JP | 2007165324 A | 6/2007 |
| JP | 2010032349 A | 2/2010 |
| JP | 2010086911 A | 4/2010 |
| WO | 96/35252 A1 | 11/1996 |
| WO | 96/35253 A1 | 11/1996 |

OTHER PUBLICATIONS

Martinez, Carlos et al; Using Cell Balancing to Maximize the Capacity of Multi-cell Li-Ion Battery Packs; Application Note; Jun. 7, 2005; pp. 1-8.

Search Report from corresponding GB Application No. GB1116055.3 dated Oct. 25, 2011.

* cited by examiner

US 8,395,519 B2

DEVICE AND METHOD OF DETERMINING SAFETY IN A BATTERY PACK

BACKGROUND

The present disclosure is related to the field of energy storage devices. More specifically, the present disclosure is related to determining a safety status of a battery pack.

Modern rechargeable batteries include one or more cells that store and release energization with the operation of the battery. Battery cells are susceptible to be compromised in a variety of ways including overcharge, undercharge, or physical damage. These conditions can lead to a short circuit of one or more of the cells which causes an increase in the temperature and pressure within the cells. The increase in temperature and pressure creates, in a critical condition, a risk of fire and/or explosion of the battery cells.

BRIEF DISCLOSURE

A battery pack with at least one battery cell is disclosed herein. The at least one battery cell expands and contracts in relation to the chemical conditions of the battery cell. A substrate with a first portion is configured to contact a first portion of the battery cell. A sensor is attached to the substrate and produces a signal indicative of a displacement of the substrate. A controller is communicatively connected to the sensor such that the controller receives the signal from the sensor and processes the signal to produce an indication of a status of the battery cell.

A safety device for use with a battery includes a substrate with opposing first and second portions. The first portion of the substrate is configured to contact a first portion of the battery and the substrate is configured to remain movable with respect to the battery. A light emitting diode (LED) is secured to the substrate and projects electromagnetic energization across a surface of the substrate. A phototransistor is secured to the substrate opposite the LED such that the phototransistor receives the energization from the LED and produces a signal indicative of the received energization. A controller is communicatively connected to the phototransistor. The controller receives the signal indicative of the received energization and processes the received signal to determine a safety status of the battery.

A method of monitoring battery safety is disclosed herein. The method includes securing a flexible substrate across at least one cell of a battery. At least a first portion of the substrate is secured with respect to the at least one cell and at least a second portion of the substrate is movable with respect to the at least one cell. A displacement of the substrate is measured with a sensor coupled to the substrate. The measured displacement is processed with a controller to identify a safety status of the at least one cell of the battery. An output device is operated by the controller to provide an indication of the safety status of the at least one cell of the battery.

DETAILED DISCLOSURE

Figure 1:
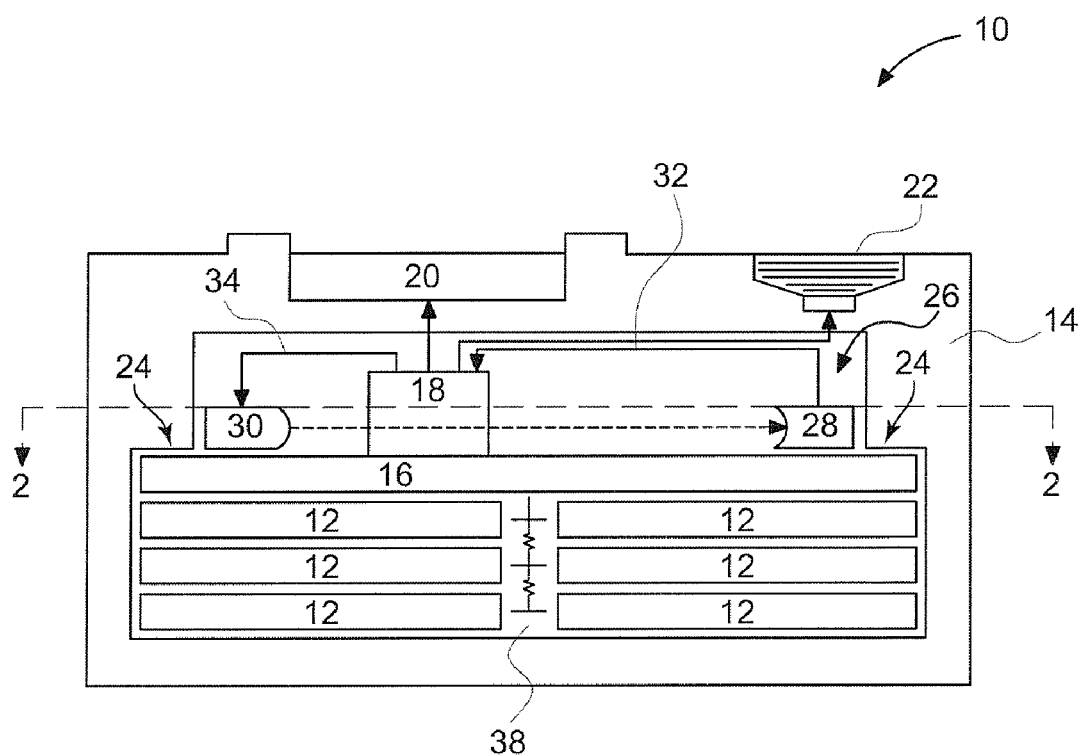
FIG. 1 is a cut away view of an exemplary embodiment of a battery pack.

FIG. 1 depicts an embodiment of a battery pack 10. The battery pack 10 includes at least one cell 12. In many embodiments, the battery pack 10 includes a plurality of cells 12. The cells 12 may be any of a variety of rechargeable battery cells. One exemplary construction of a cell 12 is that of a lithium ion polymer cell, such as is known in the field for use in rechargeable battery applications.

An exemplary construction of the cell 12 includes a outer layer constructed of a thin film or foil, such as Mylar, configured to form a pocket or pouch within which the dielectric material (e.g. lithium ion polymer) is held. In some embodiments, the dielectric material is a solid polymer while in alternative embodiments the dielectric material is an electrolytic liquid. The foil pouches of the cells 12 are sealed at the edges to form an open interior. As the cells store electrical charge, the dielectric material gives off gases which are held within the foil pouch. This causes expansion of the foil pouch in a manner similar to a balloon with the sealed edges remaining substantially flat while the cell 12 expands in the middle. As the cell 12 discharges, the gas is reabsorbed into the dielectric material and the cell 12 returns to a contracted condition. Over the course of a normal charge-discharge cycle, a cell 12 may expand and contract within a range of 5-10%. In an exemplary embodiment, the cells 12 are approximately 6 millimeters in a narrow dimension (depicted as height in FIG. 1) and therefore may experience an expansion or contraction of 1 millimeter or less over the course of a charge-discharge cycle. Overcharging at the cell 12 is one cause of cell malfunction as will be described in further detail herein.

The battery pack 10 further includes a case 14. The case 14 is constructed of a plastic or other similar material and provides protection to the components within the battery pack 10, including the cells 12. The battery pack 10 may malfunction if one or more of the cells 12 are physically damaged. Physical damage to one or more of the cells can short the cells, leading to unsafe conditions as will be described in further detail herein. The case 14 helps to protect the cells 12 from physical damage. The case 14 further provides structure and support for other components of the battery pack 10 as will be described in further detail herein. Additionally, as will be described in further detail with respect to some embodiments disclosed herein, the case 14 may be opaque in construction such that ambient light from outside of the battery pack 10 does not enter an interior of the case 14.

A substrate 16 is positioned within the case 14 parallel to at least one of the cells 12. The substrate 16 may be constructed from any number of known substrate materials that include, but are not limited to, resins or fiber embedded epoxies. The substrate is constructed such that the substrate has a flexible property. The specific degree of flexibility of the substrate 16 may vary depending upon the construction for a particular application of the embodiment; however, as will be shown in further detail herein, the substrate 16 bends with the expansion and/or contraction of the cells 12. In an embodiment, substrate 16 is a printed circuit board (PCB) that is used to mechanically support and electrically connect electronic components of the battery pack 10. A few of the electronic components connected to the substrate 16 will be disclosed in further detail herein; however, it will be understood by one of ordinary skill in the art that the substrate 16 will be populated with additional electronic components as needed for other functions and operations of the battery pack 10.

A controller 18, which in an embodiment is a microprocessor, is depicted as being supported and electrically connected with the substrate 16; however, it is understood that additional electronic components on the PCB 16 will also be communicatively connected to and operated by the controller 18.

The controller 18 forms a variety of functions and processing as disclosed herein. The controller 18 may be communicatively connected to a non-transient computer readable medium, e.g. flash memory that is programmed with computer readable code that when executed by the controller 18 causes the controller 18 to perform the functions as disclosed herein.

The controller 18 is communicatively connected to one or more output devices. These output devices include a graphical display 20 and a speaker 22. The graphical display 20 presents output indications from the controller 18 as a visual representation and the speaker 22 presents outputs from the controller 18 in an audio representation.

In an embodiment that includes multiple cells 12, the cells 12 are arranged in a stacked configuration with the cells 12 stacked with their narrow dimension in the vertical direction. Still other embodiments may place the cells side by side such that the cells' elongated dimensions are aligned. As depicted in FIG. 1, a plurality of cells 12 may be arranged in a combination of these two arrangements include multiple vertical stacks in horizontal alignment. In stacked embodiments of multiple cells 12, the cells are secured to one another with the use of an adhesive. In an exemplary embodiment, this adhesive is an adhesive tape. While the substrate 16 is configured so that at least a portion of the substrate 16 is in contact with one or more cells 12, the substrate 16 is arranged to float on the cells 12, rather than be secured to the cells 12. This allows for the substrate 16 to move independently from the cells 12, but the displacement of the substrate 16 is in response to the expansion and/or contraction of the cells 12. One or more lips 24 of the case 14 may hold at least a first portion of the substrate 16 in a position in contact with one or more of the cells 12, while allowing the substrate 16 to float on the cells 12.

A sensor 26 is arranged on the substrate 16. The sensor 26 measures a displacement of the flexible substrate 16 caused by the expansion or contraction of the cells 12. In the embodiment depicted in FIG. 1, the sensor 26 is a phototransistor 28 that receives electromagnetic energization from a light emitting diode (LED) 30 that is positioned on the substrate 16 opposite the phototransistor 28. However, it is understood that alternative configurations of sensors for sensing the displacement of the substrate 16 may be used within the scope of this disclosure. Non-limiting examples of alternative types of sensors 26 that may be used include a strain gauge (not depicted) positioned across the substrate 16 or a pressure transducer (not depicted) positioned between the substrate 16 and at least one cell 12.

The controller 18 operates the LED 30 to produce electromagnetic energization (e.g. visible ultraviolet, or infrared light) that travels across the surface of the substrate 16 and is received by the phototransistor 28. The phototransistor 28 is communicatively connected to the controller 18 and the phototransistor 28 produces a signal that is indicative of the electromagnetic energization received by the phototransistor 28. As noted above, in embodiments, the case 14 is of an opaque construction such that ambient light from outside of the battery pack 10 is blocked from entering the interior of the case 14. Therefore, without distortion from ambient light, the phototransistor 28 can be sensitive to a relatively low level of electromagnetic energization produced by the LED 30.

As noted above, the phototransistor 28 produces a signal indicative of the received electromagnetic energization from the LED 30. This signal is sent from the phototransistor 28 to the controller 18. The controller 18 compares the signal received from the phototransistor 28 to a control signal sent from the controller to the LED 30 in order to evaluate the electromagnetic energization received by the phototransistor 28. Either by design or calibration, the electromagnetic energization received by the phototransistor 28 can be related to a displacement of the substrate 16 caused by the expansion or contraction of one or more of the cells 12. As will be described in further detail with respect to the embodiments disclosed herein, as at least a portion of the substrate 16 is displaced, the amount of the electromagnetic energization from the LED 30 received by the phototransistor 28 decreases as the LED 30 and the phototransistor 28 are moved out of alignment.

In a further embodiment, the controller 18 provides a control signal 34 to the LED 30 such that the LED 30 provides the electromagnetic energization in a predetermined pattern or frequency of pulses. This predetermined pulse train provides additional information in the sensor signal 32 produced by the phototransistor 28 after receiving the pulse train of electromagnetic energization. In an embodiment, the pulsation is in the form of a frequency modulation controlled by the controller 18. The controller can use the predetermined frequency or pulse configuration of the control signal 34 to compare to the received sensor signal 32 in order to provide an improved determination of substrate displacement by reducing error associated with reflective or ambient light received by the phototransistor 28. In an embodiment, the phototransistor 28 demodulates the incoming electromagnetic energization, the demodulated sensor signal is used to verify that the received energization is from the LED 30. It should also be understood that the controller 18 may perform the demodulation in an alternative embodiment.

Figure 2:
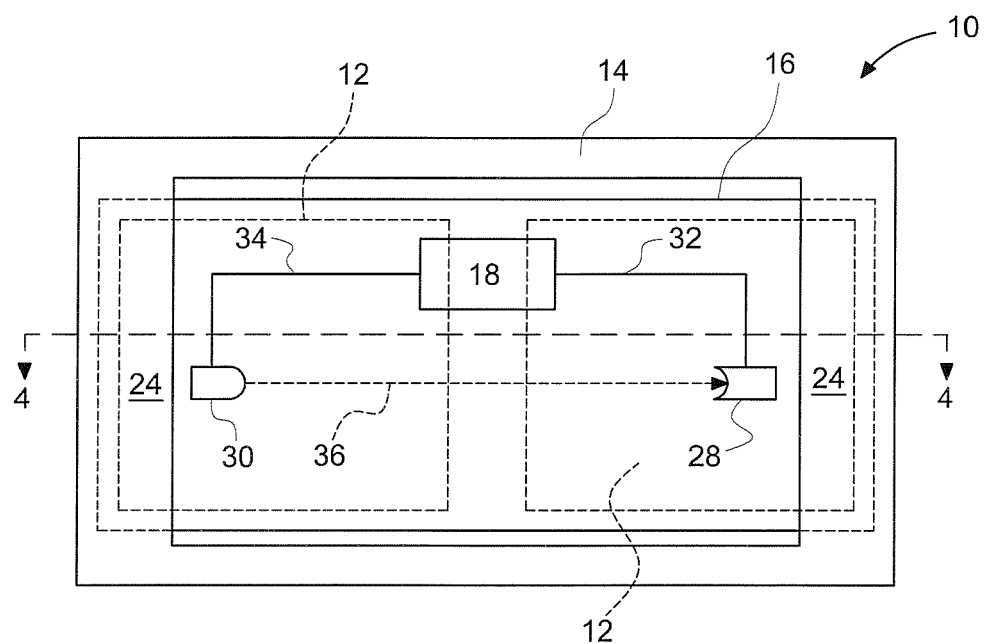
FIG. 2 is a cut away view along the line 2-2 of the embodiment of the battery pack of FIG. 1.

FIG. 2 is a cut away view of the battery pack depicted in FIG. 1 cut along line 2-2. Like reference numerals in FIG. 2 are used to identify like components as have been described above. FIG. 2 particularly highlights an alternative view of the lip 24 of the case 14. As can be seen from FIG. 2, the lip 24 extends over a first portion of both the substrate 16 as well as the cells 12 positioned below the substrate 16.

Figure 4:
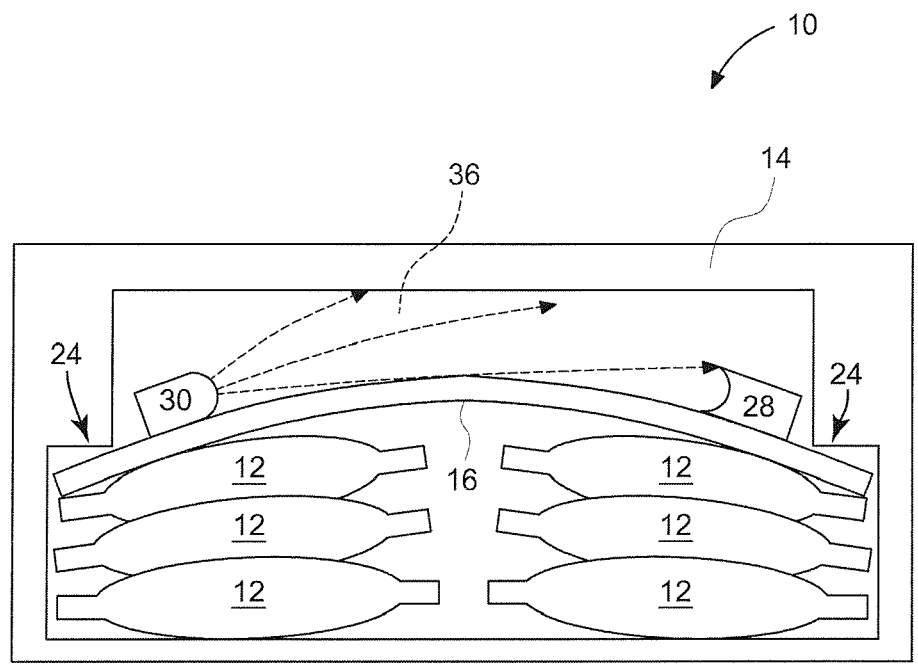
FIG. 4 is an alternative view of the battery pack of the embodiment of FIG. 2 along the line 4-4.

FIG. 4 depicts the same embodiment of the battery pack 10 as depicted in FIGS. 1 and 2 cut along line 4-4 in FIG. 2. However, in the battery pack 10 of FIG. 4, the cells 12 have expanded beyond a normal expansion experienced by the cells during normal operation. In modern battery applications using the cells 12 as described above, when a cell 12 reaches a critical condition, the cell 12 can rapidly expand to double in size. Therefore, with the example of the cells 12 disclosed herein, a cell that is typically 6-7 millimeters may expand during a critical condition to between 12-14 millimeters.

The effect of the expansion of the cells 12 on the flexible substrate 16 floating thereon shows that at least a portion of the substrate 16 is displaced due to the expansion of the cells 12. Since the lips 24 generally hold the ends of the substrate 16 in place, the center of the substrate displaces with the expansion of the cells. The displacement of the substrate 16 moves the phototransistor 28 and LED 30 out of alignment such that the electromagnetic energization 36 from the LED 30 is not fully received by the phototransistor 28. As noted above, the phototransistor 28 produces a sensor signal sent to the controller that is indicative of the received electromagnetic energization 36. The controller analyzes the received sensor signal to note attenuation in the received signal due to the amount of misalignment between the LED 30 and the phototransistor 28. The controller 18 uses this attenuation to determine a displacement of the substrate 16 caused by the expanded cells 12.

Figure 3:
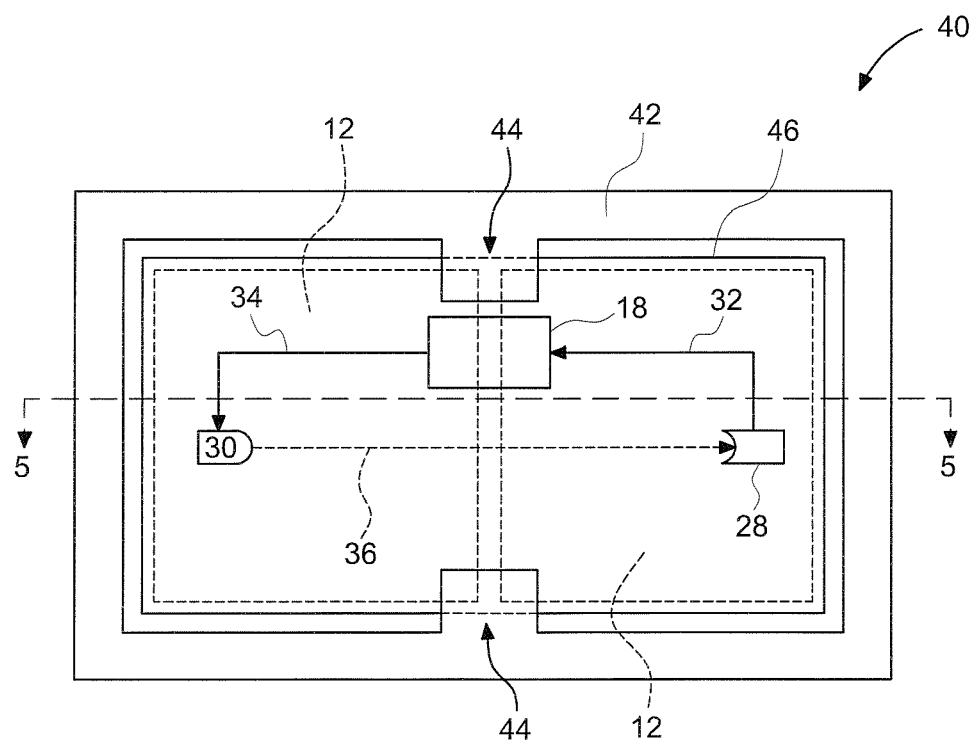
FIG. 3 is a cut away view of an alternative embodiment of a battery pack.
Figure 5:
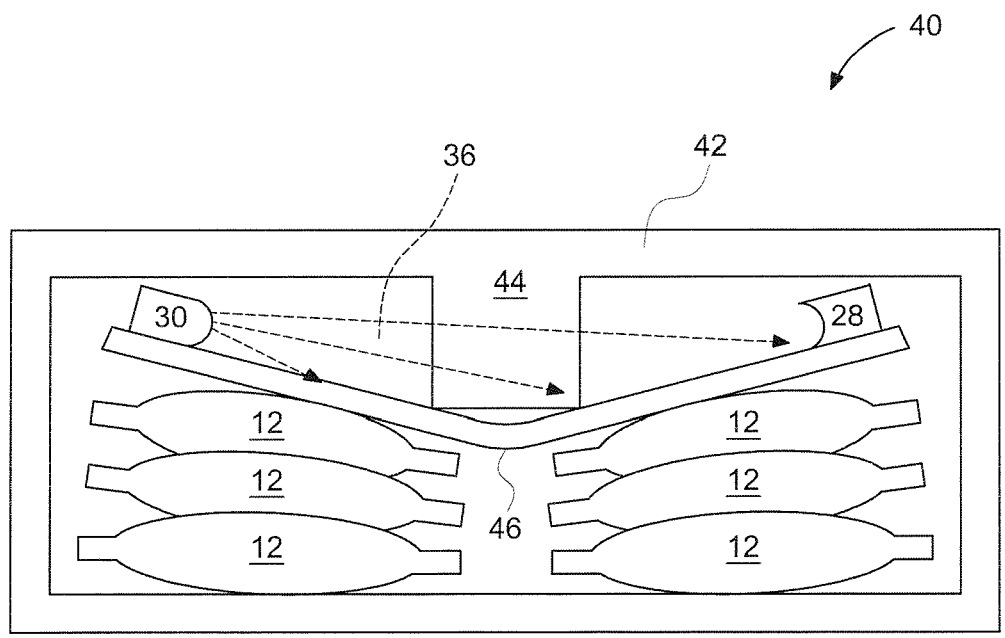
FIG. 5 is an alternative view of the embodiment of the battery pack depicted in FIG. 3 along line 5-5.

FIGS. 3 and 5 depict an alternative embodiment of a battery pack 40. Like reference numerals are used to identify like components between the embodiment depicted in FIGS. 1, 2, and 4 and the embodiment depicted in FIGS. 3 and 5. The primary distinction between the embodiments of the battery pack 10 and the battery pack 40 is with the case 42 that includes lip portions 44. The lips 44 contact the substrate 46 such as to secure a portion of the substrate 46 in contact with one or more cells 12. In the battery pack 40, the lips 44 secure an interior portion of the substrate 46 to interior edges of the cells 12. As the substrate 46 floats upon the cells 12, the end portions of the substrate 46 are free to lift out of contact with the cells 12 due to the expansion of the cells 12. Thus, in the battery pack 40, the expansion of the cells 12 displaces the end portions of the substrate 46 upwards. This alternative displacement of the substrate 46 carries with it the same effect as the displacement of the substrate 16 in the battery pack 10. Namely, the LED 30 projects electromagnetic energization 36 in a direction, such that the phototransistor 28 does not receive a substantial portion of the electromagnetic energization 36. The controller 18 receives a control signal from the phototransistor 28 that reflects this reduction in received electromagnetic energization. The controller 18 determines a displacement of the substrate 46 from the amount of electromagnetic energization 36 received by the phototransistor 28.

In a still further embodiment, the controller 18 may operate the LED 30 such as to produce a frequency modulated electromagnetic energization 36. The phototransistor 28 will receive this frequency modulated electromagnetic energization and produce a sensor signal accordingly. As noted above, either the phototransistor 28 or the controller 18 demodulates the received electromagnetic energization. The addition of a frequency content to the electromagnetic energization 36 allows for the controller 18 to compare the control signal 34 to the sensor signal 32 not only on the basis of intensity, but further upon the basis of the frequency content. This provides additional processing information that may be used in embodiments of the controller 18 to perform additional analysis of the safety status of the cells 12 of the battery pack 40.

In one exemplary embodiment of a battery pack disclosed herein, the controller further provides a tamper evident detection that monitors for a condition wherein the case 14, 42 has been opened. The intricate electronic controls required to properly operate the battery packs disclosed herein, as well as the potential electrical charges stored by the cells of the battery packs present dangers that result from a breach of the case 14, 42. These dangers include the potential for electric shock from one or more of the charged cells 12. Additionally, dangerous risks include damage to the electronics that critically affect the operation or performance of the battery pack 10, 40 or the cells 12 that will either impair performance of the battery pack 10, 40 or may cause a critical safety condition within one or more of the cells 12.

Therefore, the controller 18 may operate such that it detects if the phototransistor 28 is exposed to the ambient light that would enter within the case 14, 42 upon the improper breach of the case 14, 42. Such ambient light would be detected by the controller 18 in the sensor signal 32 from the phototransistor 28. The controller 18 may identify this as additional noise or other distortion in the sensor signal as compared to the sensor signal 32 when the phototransistor 28 is not exposed to ambient light. Embodiments of the battery pack as disclosed herein that include the feature of the LED 30 produce the electromagnetic energization 36 in a predetermined pulse pattern or predetermined frequency may be particularly adapted to an embodiment that identifies tampering with the battery pack components as the controller 18 has the additional frequency content information from the frequency modulation of the signal that can be further used to identify a baseline against which the distortion or noise found in the sensor signal due to exposure of the phototransistor 28 to ambient light can be compared.

Referring back to FIG. 1, as has been described herein, the controller 18 determines a safety status of the battery pack 10. Safety statuses that may be detected that are abnormal operation of the battery pack 10 may be a critical condition of one or more of the cells 12 as evidenced by excessive cell bloat that results in displacement of the substrate 16. Additionally, the controller 18 may detect that the electrical components of the battery pack 10 have been tampered with the detection of noise or distortion in the sensor signal 32 due to ambient light detected by the phototransistor.

The controller 18 may respond to these detections of the degraded safety status in a variety of ways. As previously identified, the controller 18 operates the graphical display 20 and the speaker 22 such that the controller 18 may cause the presentation of visual and/or audio alarms or indications of the detected danger. These indications may warn a user of a critical nature of the conditions detected within the battery pack 10 and may provide the user with remedial instructions.

In an alternative embodiment, the controller 18 is further connected to a discharge circuit 38. The discharge circuit is operable by the controller 18 to connect to one or more of the cells 12 to provide the controlled discharge of stored energy from the cells 12. The controller 18 automatedly connects the discharge circuit 38 to the cell 12 upon the detection of a critical cell condition. This will discharge the cells 12 to a safe level over time and place the battery pack 12 in a condition for disposal.

Combined with, or as an alternative to, the automated discharge of the cells 12, the controller 18 controls the battery pack 10 to disable the battery pack 10 from operation. This limits further damage to the battery pack. The automated disabling of the battery pack also further limits exposure of users to any critical conditions within the battery pack. The controller operates to present a visual or audio indication to notify any potential users that the battery pack has been operationally disabled.

Figure 6:
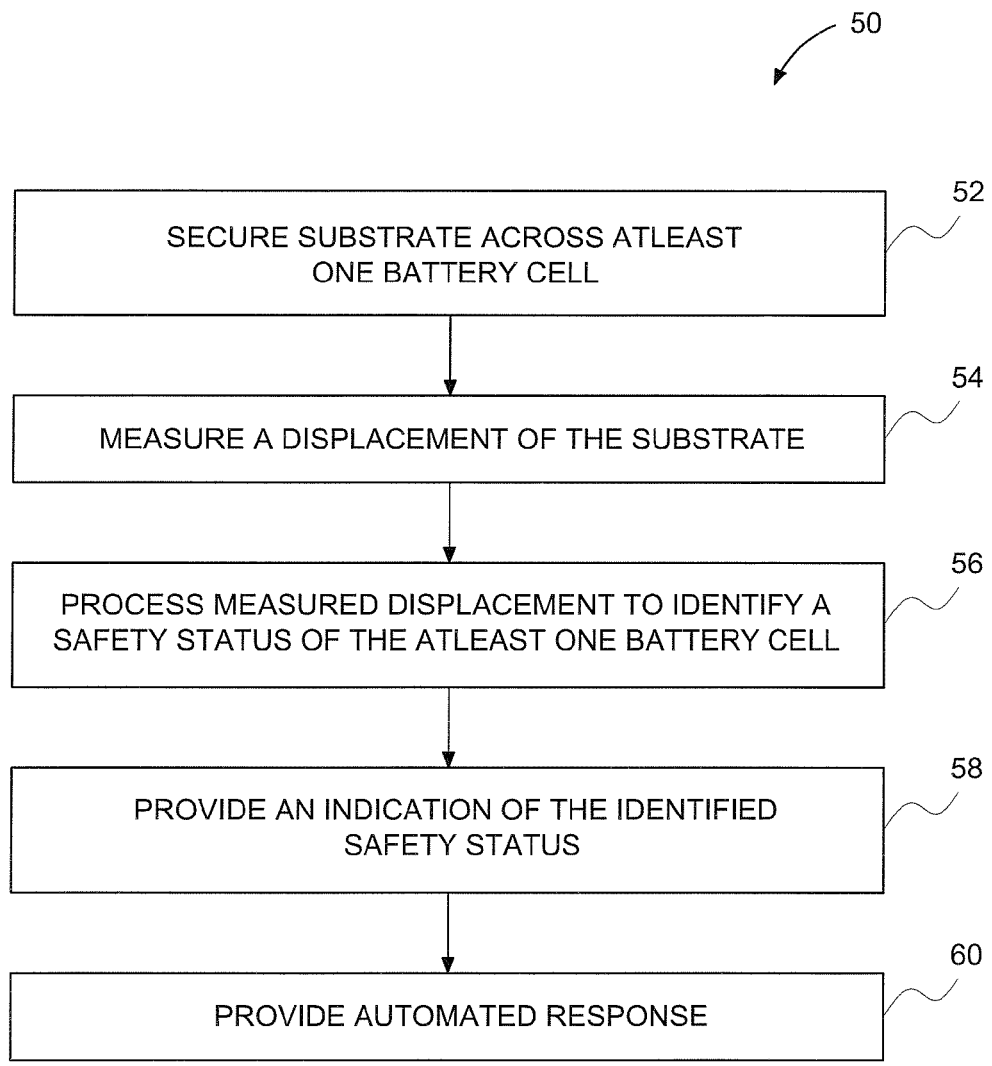
FIG. 6 is a flow chart of an embodiment of a method of monitoring battery safety.

FIG. 6 is flow chart that describes an embodiment of a method 50 of monitoring the safety of a battery. The method 50 begins by securing a substrate across at least one battery cell at 52. As disclosed above, the substrate can be movably secured such that at least a portion of the substrate is in contact with a portion of at least one battery cell; yet the substrate is secured in a manner that the substrate is movable with respect to the at least one battery cell. Therefore, expansion and/or contraction of the at least one battery cell will result in the displacement of at least a portion the substrate. In an embodiment, the substrate is constructed of material such that the substrate has a flexible or semi-rigid property; however, it is understood that alternative constructions of the substrate may be used.

Next, the displacement of the substrate is measured at 54. As noted above, the substrate is arranged such that expansion or contraction of the at least one battery cell results in a displacement of at least a portion of the substrate. This displacement can be measured through the use of a variety of sensors. One exemplary embodiment of the sensor for measuring displacement includes an LED and a phototransistor. Another exemplary embodiment for a sensor to measure displacement is a strain gauge.

At 56, the measured displacement of the substrate is processed to identify a safety status of the at least one battery cell. As noted above, during a normal charge and discharge cycles of the at least one battery cell, the at least one battery cell expands and contracts. An excessive amount of expansion or contraction of a battery cell indicates that the battery cell is in a critical condition that may result in harm or damage to the battery, the electric device powered by the battery, or a user of the battery. This harm or damage comes from a risk of fire or explosion of one or more of the cells. Therefore, the displacement of the substrate due to the expansion of the at least one battery cell can be processed by comparing to a threshold or other predetermined value that is indicative of an undesirable amount of battery cell expansion.

At 58, an indication of the identified safety status, which exemplarily is a battery cell critical condition, is provided. As described above, the indication may be a visual indication that is presented on a graphical display. The indication may further be an audio indication that is provided by a speaker that is operated by a controller. In a still further embodiment, the indication is an electronic signal that directs one or more automated responses from the controller of the battery as will be described herein.

At 60, an automated response is provided. In one embodiment, the automated response is the connection of a discharge circuit across one or more of the battery cells. The discharge circuit is operated to remove the excess energy from the cells in an effort to remediate a critical condition and render the battery inoperable. In an alternative embodiment, the controller provides an automated response of electronically disabling the battery from an operational status. This serves to limit any exacerbating conditions of the at least one battery cell and prompt a user to remove the battery from use.

Figure 7:
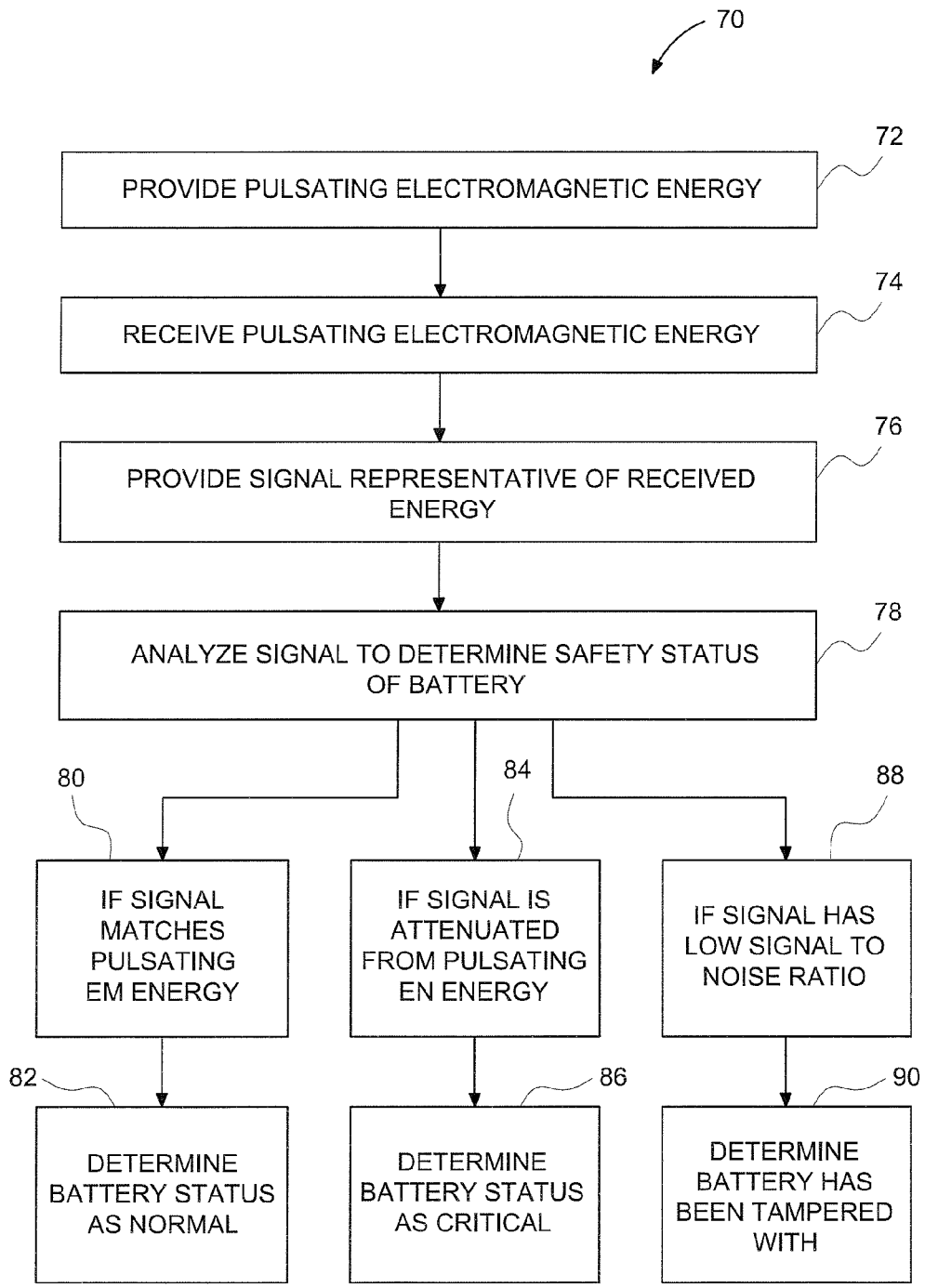
FIG. 7 is a flow chart of an alternative embodiment of a method of monitoring battery safety.

FIG. 7 is a alternative embodiment of a method 70 that may be used in connection with embodiments of the method 50. In particular, the method 70 is an exemplary embodiment of a more specific functions provided at 54-58 of the method 50.

At 72, pulsating electromagnetic energy is provided such as from an LED that is controlled by a control signal and electromagnetic energy can be pulsed at a predetermined pattern or frequency as controlled by the controller. In an embodiment, the predetermined pattern or frequency is a frequency modulation of the electromagnetic energy. At 74, the frequency modulated electromagnetic energy is received, such as by a phototransistor. The phototransistor receives the electromagnetic energy and at 76 provides a signal that is representative of the received electromagnetic energy. The signal from 76 is sent to a controller where the controller analyzes the signal at 78 to determine a safety status of the battery. In an embodiment, either the phototransistor or the controller demodulates the received electromagnetic energy.

In an embodiment, the method outlined above from 72-76 is performed upon the initial activation of the battery. In a more detailed embodiment, this is performed before the first charge of the battery cell. Therefore, the result of the method from 72-76 is to produce a reference signal. This reference, or baseline, signal is used starting at 78 for the analysis to determine the safety status of the battery. The additional value of this baseline measurement can be used in a comparative fashion in the performance of the remainder of the method in 78-90.

At 80, if the signal matches the frequency modulated electromagnetic energy, or the control signal that is sent to the electromagnetic energy source, then at 82 it is determined that the battery is operating in a normal safety status. This determination is made at 82, as if a match is found between the provided pulsating electromagnetic energy and received electromagnetic energy, then neither of the abnormal safety status criteria are met.

At 84, if the signal attenuated from the provided frequency modulated electromagnetic energy, but still retains the frequency content, then at 86 it is determined that the battery safety status is critical and one or more of the cells of the battery are bloated and in a critical condition. The attenuation of the received pulsating electromagnetic energy is a result from the displacement of the substrate which causes a misalignment between the LED and the phototransistor. Therefore, as the substrate displaces and the LED and phototransistor move further out of alignment, then the signal representative of the electromagnetic energy received by the phototransistor will attenuate in a manner representative of the substrate displacement.

Finally, at 88, if the signal representative of the received electromagnetic energy is determined to have a low signal to noise ratio, then at 90 it is determined that the battery has been tampered with. As disclosed above, the battery electronics are enclosed within an opaque case that blocks out ambient light. If the signal representative of the received electromagnetic energy comprises an increased amount of distortion or noise, this is due to the introduction of ambient light to the phototransistor.

In a first embodiment, the power used by the LED is very small in order to minimize power consumption required for the battery pack safety determination. In this case, the light produced by the LED cannot overcome the ambient light that is introduced upon the opening of the opaque battery case and the ambient light saturates the received electromagnetic energy. In an alternative embodiment that utilizes a pressure or strain gauge, the opening of the battery case may eliminate the engagement of the substrate with one or more of the lips. This will reduce the pressure or strain across the substrate and therefore reduce or eliminate the pressure or strain sensed by the sensor.

This introduction of ambient light only occurs when the opaque case of the battery has been breached, thus exposing the electronics and cells to potential damage or manipulation. Therefore, once the electronics have been exposed to a risk of damage or manipulation, the safety of the battery can no longer be guaranteed and the determination at 90 that the battery has been tampered with is used to notify a potential user that the battery may no longer operate in an intended manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A battery pack comprising:
   at least one battery cell, the at least one battery cell comprising a first portion and the at least one battery cell expands and contracts in relation to chemical conditions of the at least one battery cell;

a substrate with a first portion configured to contact the first portion of the at least one battery cell;

a sensor attached to the substrate, the sensor produces a signal, the signal being indicative of a displacement of the substrate;

a controller communicatively connected to the sensor such that the controller receives the signal from the sensor and the controller processes the signal to produce an indication of a status of the at least one battery cell.

2. The battery pack of claim 1, wherein the sensor comprises an LED and a phototransistor.

3. The battery pack of claim 2, wherein the controller operates the LED to produce pulsating energization at a predetermined frequency, and the phototransistor receives the pulsating energization from the LED.

4. The battery pack of claim 3, wherein the controller receives a signal from the phototransistor indicative of the received energization and compares a frequency of the signal to the frequency of the LED to verify that the phototransistor receives the pulsating energization from the LED.

5. The battery pack of claim 4, further comprising:

an opaque casing surrounding the at least one battery cell, the substrate, the sensor and the controller, wherein the opaque casing holds the substrate in a position wherein the first portion of the substrate contacts the first portion of the at least one battery cell;

wherein if the opaque casing is opened, the phototransistor is exposed to ambient light that distorts the received energization and the controller identifies the signal from the phototransistor as being indicative of an opened casing and produces a signal indicative that the battery pack has been opened.

6. The battery pack of claim 5, further comprising a graphical display connected to the controller, and upon producing the signal indicative that the battery pack has been opened, the controller operates the graphical display to present a visual indication that the battery pack has been tampered with.

7. The battery pack of claim 1, further comprising a graphical display connected to the controller, and the controller, upon identifying a signal from the sensor as critical, operates the graphical display to produce a visual warning.

8. The battery pack of claim 7, further comprising a speaker operated by the controller to produce an audible alarm upon identifying a signal from the sensor as critical.

9. The battery pack of claim 1, further comprising:

a discharge circuit selectively connected to the at least one battery cell, the discharge circuit being connected to and operable by the controller;

wherein the controller, upon identifying a signal from the sensor as critical, operates the discharge circuit to connect to the at least one battery cell to discharge the at least one battery cell from the critical condition.

10. The battery pack of claim 1, wherein the sensor is a strain gauge.

11. A safety device for use with a battery, the safety device comprising:

a substrate with opposing first and second portions, the first portion being configured to contact a first portion of the battery, wherein the substrate is configured to remain movable with respect to the battery;

a light emitting diode (LED) secured to the substrate to project pulsating energization at a predetermined frequency across a surface of the substrate;

a phototransistor secured to the substrate opposite of the LED such that the phototransistor receives the pulsating energization from the LED and produces a signal indicative of the received pulsating energization;

a controller communicatively connected to the phototransistor, the controller receives the signal indicative of the received pulsating energization and processes the received signal to determine a safety status of the battery, wherein if the phototransistor fails to receive the pulsating energization from the LED, the controller determines that the battery is in a critical status.

12. The safety device of claim 11, further comprising a graphical display and if the controller determines that the battery is in a critical status, the controller operates the graphical display to present an indication that the battery is in a critical status.

13. The safety device of claim 12, further comprising:

an opaque case configured to surround the substrate, the LED, the phototransistor, and the controller, and further configured to hold the first portion of the substrate in contact with the first portion of the battery;

wherein the opaque case blocks ambient light from the phototransistor, the ambient light received by the phototransistor creates noise in the signal indicative of the received pulsating energization, and the controller identifies the noise in the signal from the phototransistor as being indicative that the opaque case has been breached and operates the graphical display to indicate that the opaque case has been breached.

14. The safety device of claim 13, further comprising:

a discharge circuit selectively connectable across the battery, the discharge circuit being communicatively connected to and operated by the controller;

wherein if the controller identifies a critical status or identifies that the opaque case has been breached, the controller operates the discharge circuit to connect across the battery to discharge the battery.

15. The safety device of claim 11 wherein the first portion of the substrate is configured to contact a first cell of the battery and the second portion of the substrate is configured to contact a second cell of the battery, the second cell being arranged adjacent the first cell.

16. A method of monitoring battery safety, the method comprising:

movably securing a substrate across at least one cell of a battery wherein at least a first portion of the substrate is secured with respect to the at least one cell and at least a second portion of the substrate is movable with respect to the at least one cell;

measuring a displacement of the substrate with a sensor coupled to the substrate;

processing the measured displacement with a controller to identify a safety status of the at least one cell of the battery;

operating an output device with the controller to provide an indication of the safety status of the at least one cell of the battery.

17. The method of claim 16, wherein the sensor is a strain gauge.

18. The method of claim 16, wherein the sensor comprises a phototransistor, and further comprising:

producing a pulse train of electromagnetic energization at a predetermined frequency with a light emitting diode (LED) operated by the controller with a control signal of the predetermined frequency;

receiving the pulse train of electromagnetic energization with the phototransistor;

producing a pulse signal with the phototransistor, the pulse signal being indicative of the pulse train received by the phototransistor; and comparing the pulse signal to the control signal with the controller to determine the safety status of the at least one cell of the battery.

19. The method of claim 18, wherein if the pulse signal does not match the control signal, the controller determines the safety status of the at least one cell of the battery as critical.

20. The method of claim 18, wherein if the pulse signal comprises a significant amount of noise with respect to the control signal, the controller determines the safety status of the at least one cell of the battery as the battery has been tampered with.

* * * * *